June 10, 1930.  O. BUYS  1,763,217
MOVABLY SUPPORTED METER
Filed Oct. 19, 1925    2 Sheets-Sheet 1
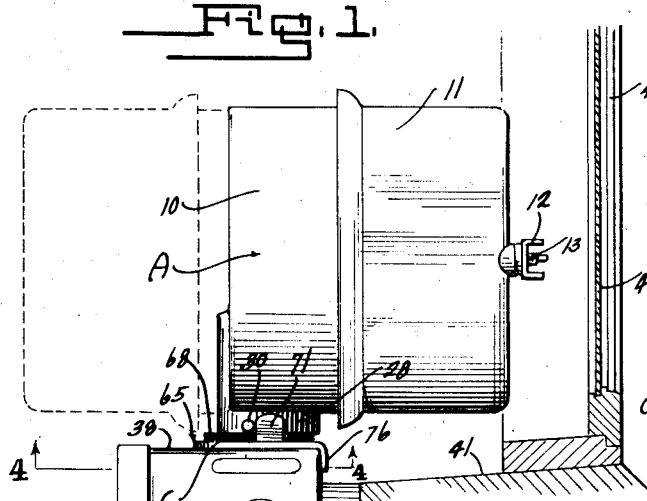
Fig. 1.
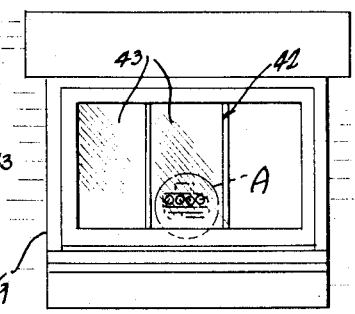
Fig. 2.
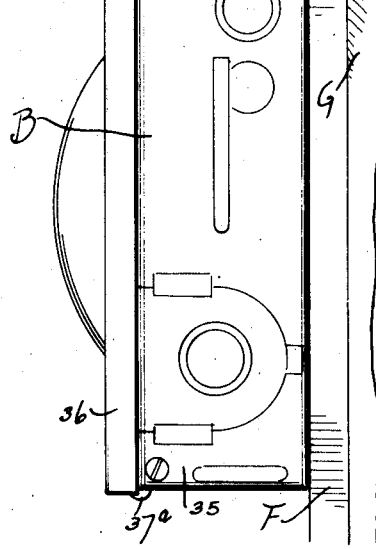
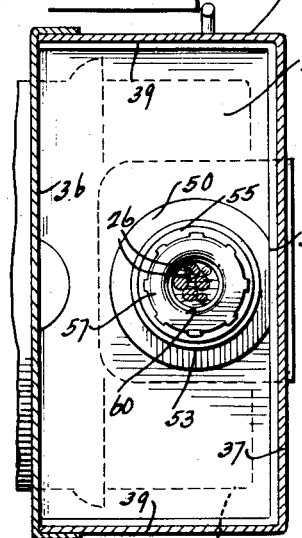
Fig. 4.
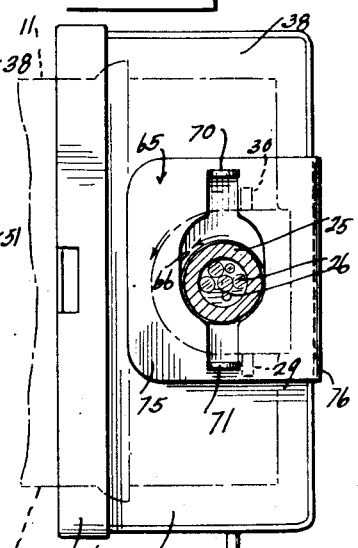
Fig. 3.
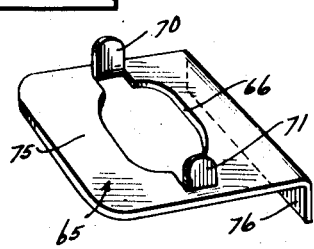
Fig. 9.
Inventor
Orville Buys
Lancaster Alwine
Attorneys June 10, 1930. O. BUYS 1,763,217
MOVABLY SUPPORTED METER
Filed Oct. 19, 1925 2 Sheets-Sheet 2
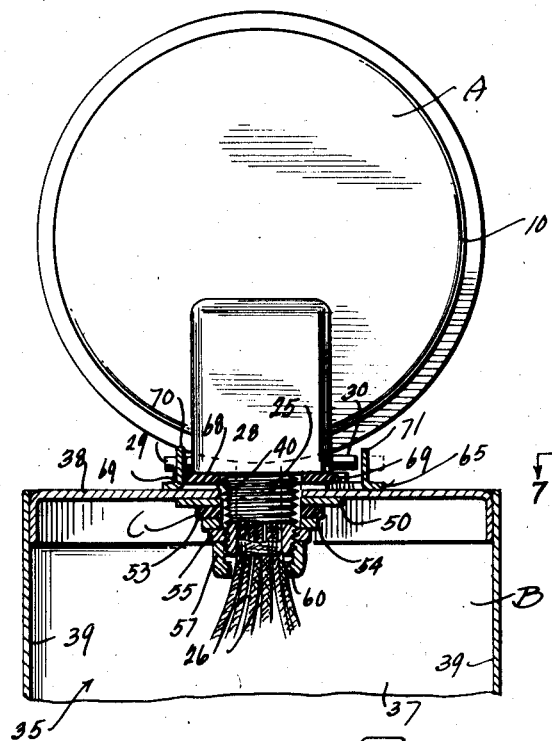
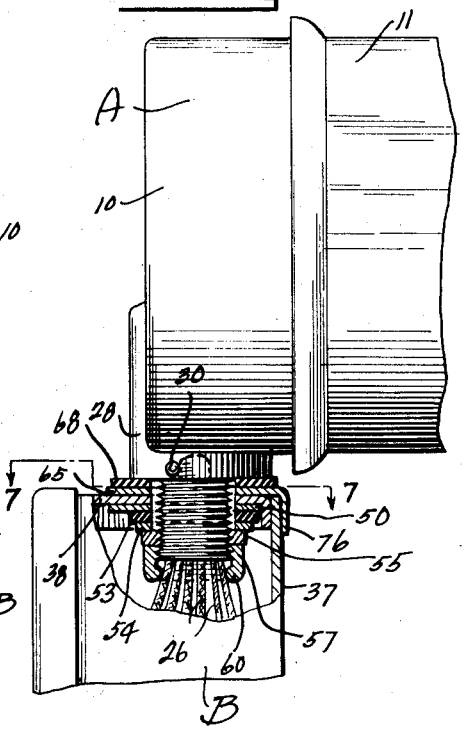
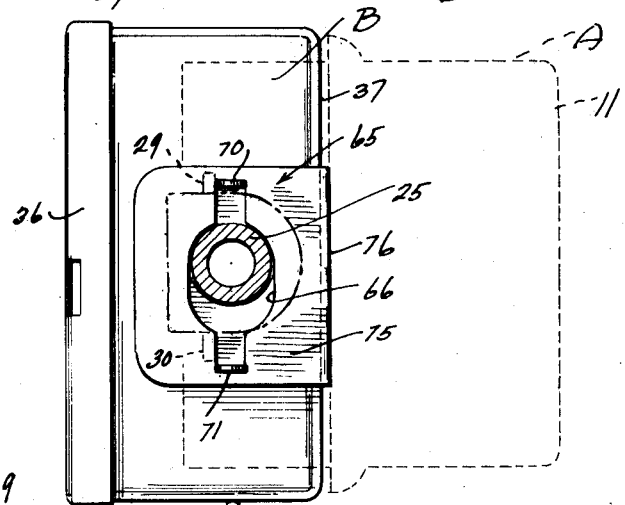
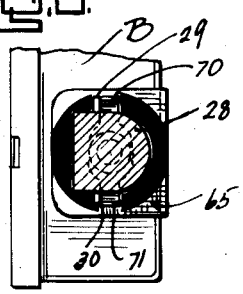
Inventor
Orville Buys Patented June 10, 1930

1,763,217

UNITED STATES PATENT OFFICE

ORVILLE BUYS, OF PITTSBURGH, PENNSYLVANIA

MOVABLY-SUPPORTED METER

Application filed October 19, 1925. Serial No. 63,520.

This invention relates to improvements in electrical meter constructions and means for mounting the same.

The primary object of this invention is the provision of means for mounting an electric meter so that it may be faced in one direction for reading purposes, and turned to face in another direction to enable the testing, adjustment, or repair of the parts thereof.

For present day use it is highly desirable to have an electric meter placed in such manner on a customer's premises, that an inspector may readily take the reading without the necessity of entering the premises. It is also essential, from time to time, to test, adjust, and repair parts of the meter construction. With these problems in mind, the improved meter construction herein set forth consists of a meter mounted to admit of its rotation. The meter is preferably located within the basement, cellar, or other room wherein it is protected from exposure, so mounted that it may be swung and held in one position with relation to a window or other sight aperture, so that an inspector or other authorized individual may readily ascertain the reading from exteriorly of the room or compartment wherein the meter is located. Furthermore, the meter is so rotatably mounted that it may be swung from this position to face in another direction, so that an authorized person may enter the room or compartment wherein the meter is located, and face the meter construction interiorly of such room or compartment, for the reason of taking the same apart, testing the mechanism thereof, adjusting it, or repairing the same.

A further object of this invention is the provision of an improved electric meter construction, embodying novel means for mounting the same so that it may be rotatably swung in a limited arc either to the right or left, and locked in position against movement with the dial mechanism thereof facing in a desired direction for reading purposes, or in another and preferably opposite direction for testing or repairing purposes.

Other objects and advantages of this invention will be apparent during the course of the following detailed description.

In the accompanying drawings, forming a part of this specification, and wherein similar reference characters designate corresponding parts throughout the several views, Figure 1 is a side elevation of the improved meter construction, showing its rotatable mounting relation upon a switch-box, and showing the relation which the meter construction normally assumes with respect to a wall in which a window is provided and through which an authorized person may inspect the meter.

Figure 2 is a reduced exterior view of a basement of a building, or other location, in which a window is provided, for inspection of my improved meter which is mounted within the building.

Figure 3 is a fragmentary cross sectional view taken through the nipple connection of the meter upon its switch-box, showing the manner of mounting the same in one location to permit of the swinging of the meter in one direction about its axis of movement.

Figure 4 is a cross sectional view taken through the switch-box construction on which the meter is mounted, looking upwardly and showing the means for rotatably mounting the meter on the switch-box.

Figure 5 is a rear elevation of the meter, showing its rotatable mounting structure in section, upon a switch-box, with the means to limit rotation of the meter set to permit rotation of said meter in one direction about its axis.

Figure 6 is a side elevation, partly in section, of the details as illustrated in Figure 5.

Figure 7 is a transverse sectional view taken substantially on the line 7—7 of Figure 6, showing the adjustment of the means to limit movement of the meter construction in a rotary direction opposite to the direction in which the meter is permitted to move as illustrated in Figure 3.

Figure 8 is a reduced cross sectional view showing the meter locked upon the switch-box against rotation, as in the normal inspecting position.

Figure 9 is a perspective view of a novel member used to limit the rotary movement of the meter to either right or left, or to lock the meter in position against rotation upon its switch box.

In the drawings, wherein for the purpose of illustration is shown only a preferred embodiment of the improved movably supported meter construction, the letter A may generally designate the meter, which is adapted to be mounted as upon a switch-box B, by the novel means C, to admit of regulated rotary or shifting movement of the meter upon the switch-box.

The meter A preferably includes the cylindrical metal casing 10, which has an open face, through which access is had to the electric measuring mechanism disposed in the casing 10. This open face of the casing 10 is normally closed by means of a detachable glass cover 11, of conventional character, detachably held in position to enclose the measuring mechanism, as by means of thumb adjusting nuts 12, adjustable on screw threaded shanks 13 which are rigid with the casing 10, as in well known construction.

The meter A is preferably of the novel type set forth in my co-pending application, Serial No. 608,226, filed December 21, 1922, and includes a radially extending externally screw threaded tubular nipple or shank 25, having a passageway therethrough, through which all of the electric current connecting wires 26 are disposed, which are in any wise connected with the meter A. At the juncture of the nipple 25 with the casing 10, a cast boss 28 is provided, which rigidly supports pins 29 and 30 at diametrically opposed sides thereof, and preferably in alignment. The pins 29 and 30 may be otherwise positioned than shown, and may be of any approved number, consistent with the broad novelty in this invention, which is the provision of a meter with improved mounting means to permit of the swinging of the meter through an arc of movement which will permit of its being read in one direction, and come to another position for access to the working parts thereof. These pins 29 and 30 are preferably in opposed alignment, and are a cooperative part of the means C to be subsequently mentioned.

The switch-box B is preferably of conventional type, including the body portion 35, of sheet metal, to which is hingedly connected the closure 36, as at 37ª, so that the same may swing downwardly for exposing the switch mechanism normally contained in the box B. The body 35 includes a rear wall 37; top wall 38; and side walls 39. The top wall 38 is preferably provided with an opening 40, thru which the screw threaded nipple 25 of the meter A is extended, and suitably rotatably mounted in said opening by the means C, in order to support the meter A for rotation upon the switch-box B.

The rear wall 37 of the switch-box B is attached in any suitable manner in a stable mounted relation upon a mounting board F. The mounting board F is affixed in any approved manner to the wall or foundation G of the building which defines the room or compartment in which the meter and switch-box constructions are mounted. In the wall or foundation G is provided the sight opening 41, in which the window casing 42 is mounted, having the transparent panes 43, as in conventional casement window construction.

The switch-box B is mounted upon a mounting board F in such position that the meter A is located for swinging in a plane which intersects the plane of the sight opening 41, so that the meter A may be positioned with its dial mechanism facing the window panes 43, whereby an authorized person may read the meter from exteriorly of the building or housing in which the meter is contained. Thus, it is readily obvious that the broad principle of the invention comprehends the mounting of the meter A so that it may be swung with the dial mechanism facing the window, or that it may be swung out of this position thru a rotary movement of 45° or more, to face in a substantially opposite direction, facing interiorly of the room, in order that an authorized person may have access to the working details of the meter, for testing, adjusting, or repairing the same; the last mentioned position being illustrated by dotted lines in Figure 1 of the drawings.

Referring to the means C to effect the rotary mounting and regulating of the meter A upon the switch-box B, the shank or nipple 25 is loosely disposed thru the opening 40 of the top wall of the switch-box B. Within the switch-box is first placed a metal disc 50, the same having an opening therethrough to loosely receive the shank or nipple 25 of the meter casing as is illustrated in Figure 4 of the drawings, a segment of the disc 50 is cut away to provide a straight edge 51 adapted to abut against the rear wall or inside surface of the switch-box B, in order to prevent a rotary movement of the same. An insulation fiber washer 53, of ring-shaped formation, is placed over the nipple 25, loosely disposed upon the same, and this washer is of a type boiled in paraffin or analogous material to make the same self-lubricating, and in effect providing an anti-friction means to facilitate the rotary movement of the meter A upon the switch-box B. A metal lock washer 54 is next slipped over the nipple 25, in abutment with the washer 53, and a lock nut 55 is then threaded upon the nipple 25, and adjusted thereon into clamping engagement with the lock washer 54, to suitably tension the same in order to insure that there shall be no longitudinal play of the nipple within the switch-box. A bushing nut 57 is then threaded upon the nipple 25, into locking abutment with the nut 55. This bushing nut 57 is of hollow formation, having a passageway therein thru which the wires 26 extend, as is illustrated in the drawings. The main function of the bushing nut 57 is really to protect the wires 26 incident to the rotary movement of the meter upon the switch-box B, and to this end the lower portion of the bushing nut 57 extends below the lowermost edge of the nipple 25, and on this portion which extends below the nipple, the bushing nut 57 is provided with an inwardly extending annular flange 60, having a convexly arcuated or rounded inner periphery against which the wires 26 abut during the rotary movement of the meter, and thus guiding the wires 26 and preventing the cutting thereof against other parts of the nipple and meter and switch-box.

Prior to the above assemblage the regulating stop plate or member 65 is placed upon the top wall 38 of the switch-box B, the same having an elongated opening 66 therein adapted to align with the opening 40 of the wall 38, to permit insertion of the nipple 25 as above mentioned, and to attach the member 65 to the nipple. Upon the top of the stop member 65 is disposed a ring-shaped self-lubricating washer 68, of the fiber insulating type, preferably impregnated with paraffin or some other lubricating material. This washer is provided with an opening through which the nipple 25 extends, and the washer is exposed so that the shoulder at the juncture of the nipple 25 and boss 28 of the meter casing 10 bears directly thereon, as is illustrated in Figures 5 and 6 of the drawings. With the details of the invention so arranged, it is obvious that the meter A is mounted upon the switch-box B for a rotary movement. Due to the self-lubricating nature of the washers 53 and 68, the meter A is rotatably mounted for easy turning upon the switch-box B. These washers do not rotate, but remain stationary. The upper washer 68 is provided with slots 69 inwardly of the outer periphery thereof, adapted to engage certain lug or stop extensions 70 and 71 of the stop member 65, as illustrated in Figure 5 of the drawings. The nuts 55 and 57, as well as the lock washer 54 all rotate upon rotation of the nipple, and the lock washer slides freely over the stationary self-lubricating washer 53.

Referring to the construction of the member 65 which controls the direction in which the meter A may rotate, or locks the same in position upon the switch-box B, the body portion 75, as above mentioned is provided with an elongated slot or opening 66 therein, and at the ends of this elongated opening 66, which is preferably oval or elliptical in form, upwardly projecting stop extensions 70 and 71 are placed. The member 65 is so mounted upon the meter box B, that the stop extensions 70 and 71 are arranged at diametrically opposed sides of the nipple 25. The opening 66 is of such form that the nipple 25 extends freely therethrough, so that the member 65 may be transversely slid to position the stop extensions 70 or 71 in the desired relation towards or away from the nipple 25. and the meter casing stop pins 29 and 30. In order to prevent a rotary movement of pivoting of the member 65 upon the switch-box B, a depending retaining flange 76 is struck downwardly therefrom, adapted to rest against the wall 37 of the switch-box B, as illustrated in Figure 6 of the drawings, in order that the opening 66 will always be arranged transversely of the switch-box B, and the member 65 guided in a path of rectilinear movement across the top wall of the switch-box B.

The spacing of the pins 29 and 30, and the distance from the free end of one of the said pins to the free end of the other of said pins, are such that when the control member 65 is slid so that the nipple 25 is in about the middle of the elongated opening 66, the stop projections or extensions 70 and 71 will be directly in the path of the pins 29 and 30, that is, said pins will abut the stop extensions 70 and 71 upon any attempt of rotary movement of the casing 10 upon its pivot axis afforded by the nipple 25, and thus it can readily be understood that the meter A is locked upon the switch-box B against rotary movement. This locked position of parts is illustrated in Figure 8 of the drawings, and is afforded principally to prevent accidental or unauthorized rotation of the meter upon the switch-box, when it is in the desired facing relation for inspection or adjustment purposes. The improved meter can be locked in either of the positions facing the sight opening or facing the cellar, as is obvious, and by the additional spiral pins several other locking positions can be provided.

Should it now be desired to permit a rotation of the meter A upon the switch-box B, say for a swinging movement of the meter A upon its pivot, in one direction only, the operator merely needs to slide the control member 65 along the top of the box B, into the position illustrated in Figure 3, and which places the stop extension 70 out of the path of abutment of either of the stop pins 29 and 30 upon rotation of the meter A, as can readily be seen from Figure 3. This enables the meter A to be swung from the position illustrated in Figure 1, where the pin 30 abuts against the stop extension 71, thru an arc of about 180°, until the opposite pin 29 abuts against said stop extension 71, as is illustrated in full and dotted lines in Figure 3 of the drawings. Thus, the meter A may be swung from its inspecting position with respect to the window, through an angle of 180°, more or less, to position the dial and working parts of the meter A to the interior of the room in which the meter structure is mounted, so that the operator may have access thereto, for testing or adjustment. In order to swing the meter A in the opposite direction, it is merely necessary to shift the control member or plate 65 from the position illustrated in Figure 3, or from the position illustrated in Figure 8, to the position illustrated in Figure 7, so that the stop extension 70 lies in the path of movement of the stop pins 29 and 30, and so that the extension 71 is removed from the path of movement of said pins. Thus, in the position illustrated in Figure 7, the meter A may be swung thru 180° of rotation in an opposite direction from that swinging which occurs when the parts are positioned as illustrated in Figure 3, to locate the meter A in a desired facing relation. Thus, it can readily be understood that merely by shifting of the control member 65, the meter A may be made to swing for a limited degree of rotation in either direction about its axis, or may be locked in a desired position as illustrated for the arrangement of parts shown in Figure 8.

It is to be distinctly understood that many modified arrangements can be provided for rotatable support of the meter upon the switch-box B, or in fact for a rotatable movement of the meter upon any support. The broad principle of the invention, is as above mentioned, the provision of a movable meter capable of being shifted to enable its dial reading when facing in one direction, and to place the same in a facing relation in another direction when it is desired to have access thereto. A simplified stop movement of the rotary meter upon a support would be the provision of a bolt on the top wall of the switch-box, to engage the stop pins or analogous elements of the meter casing. The bearing for rotation of the meter in the switch-box may be altered and made as simple as possible.

The reason for limiting the rotary movement of the meter upon the switch-box B can well be understood, since it is provided to limit twisting of the wires 26 and possible breakage of the same. It is important to note that the meter is in no wise itself fastened to the wall, but is rotatably supported in novel manner by the switch-box.

From the foregoing description of this invention it is apparent that a novel type of meter has been provided, having a movable mounting which enables the meter to be swung either to the right or left in either of opposite directions, with means to lock the same in the direction in which faced against rotary movement.

The meter may also be used in connection with special types of adapters or saddles, with appropriate means for rotary mounting of the same as above mentioned.

The improved meter construction may be installed in a cellar or other room or building, with the meter out of direct line of the window. The plane of the meter may be at an angle with respect to the line of the window, so that the meter will not obstruct the entrance way of the window. Thus, the meter can be set off to one side of the window, with the sight opening facing diagonally to the line of the window opening, and for such purpose it is desirable that the swing of the meter be less than 180°, as is readily obvious.

Various changes in the shape, size, and arrangement of parts may be made to the form of invention herein shown and described, without departing from the spirit of the invention or the scope of the claims.

I claim:

1. In combination with a supporting wall having a sight opening therein, of a meter provided at one side with a reading dial mechanism and means at said side whereby access may be gained to the mechanism of the meter for testing and adjusting purposes, means rotatably mounting said meter at one side of said wall in such proximity to the sight opening thereof that the meter reading portion may be aligned with said sight opening to be observed by a person at the opposite side of said wall from said meter mounting, or the meter swung to face the reading portion away from said sight opening so that access may be readily gained to the mechanism of the meter by a person at the same side of the wall as that side to which the meter mechanism is mounted, and adjustable means for limiting the rotation of said meter to either a desired right or left pivoted movement about its axis.

2. In combination with a supporting wall having a sight opening therein, of a meter provided at one side with a reading dial mechanism and means at said side whereby access may be gained to the mechanism of the meter for testing and adjusting purposes, means rotatably mounting said meter at one side of said wall in such proximity to the sight opening thereof that the meter reading portion may be aligned with said sight opening to be observed by a person at the opposite side of said wall from said meter mounting, or the meter swung to face the reading portion away from said sight opening so that access may be readily gained to the mechanism of the meter by a person at the same side of the wall as that side to which the meter mechanism is mounted, and detent means for limiting the rotation of said meter for a desired right or left rotary movement about its axis, for part of a circumferential movement or for locking said meter against rotary movement in any direction with its reading portion facing towards or away from said sight opening.

3. In a movable meter construction the combination of a support, a meter mechanism including a casing having a rigid tubular nipple extending therefrom, said meter mechanism including electric current measuring mechanism therein having wires extending thru said tubular extension of the meter casing, and means rotatably mounting the tubular extension upon said support.

4. In a movable meter construction the combination of a support, a meter mechanism including a casing having a rigid tubular nipple extending therefrom, said meter mechanism including electric current measuring mechanism therein having wires extending thru said tubular extension of the meter casing, means rotatably mounting the tubular extension upon said support, and means for limiting the degree of rotary movement of said casing upon said support.

5. In a movable meter construction the combination of a support, a meter mechanism including a casing having a rigid tubular nipple extending therefrom, said meter mechanism including electric current measuring mechanism therein having wires extending thru said tubular extension of the meter casing, means rotatably mounting the tubular extension upon said support, means for limiting the degree of rotary movement of said casing upon said support, and means for locking the meter casing in a desired position with respect to its support against rotation.

6. In combination with a switch-box having a wall with an opening therein, a meter construction including a casing having a tubular extension leading therefrom, electric current measuring mechanism in the casing including wires projecting thru said extension, and including a reading portion and means for access to the electric current measuring mechanism at one side of said casing, and means rotatably mounting the tubular extension of the meter casing upon said switch-box with the wires extending into the switch-box and whereby the reading portion and the means for access to the measuring mechanism of the meter may be faced in a desired direction with respect to said switch-box wall opening.

7. In combination with a switch-box having an opening therein, a meter construction including a casing having a tubular extension leading therefrom, electric current measuring mechanism in the casing including wires projecting thru said extension, and including a reading portion and means for access to the electric current measuring mechanism at one side of said casing, means rotatably mounting the tubular extension of the meter casing upon said switch-box whereby the reading portion and the means for access to the measuring mechanism of the meter may be faced in a desired direction with respect to said switch-box and with the wires extending into the said switch-box, a stop projection carried by the switch-box, and means carried by the meter casing to cooperate with said stop projection of the switch-box to limit the rotary movement of the casing with respect to the switch-box.

8. In combination with a switch-box having an opening therein, a meter construction including a casing having a tubular extension leading therefrom, electric current measuring mechanism in the casing including wires projecting thru said extension, and including a reading portion and means for access to the electric current measuring mechanism at one side of said casing, means rotatably mounting the tubular extension of the meter casing in said switch-box whereby the reading portion and the means for access to the measuring mechanism of the meter may be faced in a desired direction with respect to said switch-box, oppositely disposed stop pins on the meter casing, and a shiftable member on the switch-box including stop projections adapted to cooperate with the stop pins of said meter casing whereby to permit rotation of the meter casing in either direction about its axis for a limited degree of rotary movement, or lock the meter against rotary movement with respect to the switch-box when said member is shifted so that its stop projections engage both the pins of said meter casing.

9. In a device of the class described a meter casing having a screw threaded projection, a wall member having an opening therein, said screw threaded projection extending thru said opening, a self-lubricating washer at the juncture of the casing with the exterior of the wall member, a second self-lubricating washer about said projecton of the meter casing at the interior surface of said wall member, and nut means adjustably threaded on the projection for rotatably clamping the same in position in said wall opening.

10. In a device of the class described a switch-box having an opening therein, an electric meter including a casing having a tubular wire receiving nipple thereon, means rotatably mounting the nipple in the opening of the wall of said switch-box so that the meter casing may be rotated with respect to the switch-box upon said nipple as an axis, oppositely extending stop pins on the meter casing above the wall of said switch-box, and a shiftable controlling member mounted at the juncture of the switch-box wall and meter casing having a pair of stop projections adapted to selectively cooperate with the stop pins of the meter casing, one stop projection of the control member being adapted to cooperate with an adjacent stop pin, said stop pins bearing such a spaced relation with respect to the stop projections of said control member whereby the meter casing may be rotated thru a limited arc in either direction about its axis, or the control member shifted so that both the stop projections thereof engage the stop pins of the meter casing to prevent rotation of the latter with respect to the switch-box.

11. In combination with a meter including a dial face, a support, and means associated with the meter and support to rotatably mount the meter on an axis of movement which intersects the meter.

12. In a meter mounting construction the combination of a meter including a dial face, a support, and means associated with the meter and support including a pivot extension to rotatably mount the meter for movement about the axis of the pivot extension, the axis of the pivot extension being arranged to intersect the meter.

13. In a meter mounting construction, a fixed switch box, a meter having a reading portion, means rotatably mounting the meter exteriorly and directly on a non-movable part of the switch-box so that the reading portion may be faced in different directions with respect to the switch-box, and conducting wires extending from the meter to within the switch box in a sealed connection therebetween.

14. In a meter mounting construction the combination of a meter including a casing having a dial face, a support, a pivot extension connected with the support and casing for rotatably supporting the meter casing for rotary movement about the axis of said pivot extension, the pivot extension being arranged so that the axis thereof is disposed in intersecting relation with the meter casing and parallel with the dial face thereof so that the said dial face may be turned to face in different directions with respect to the support.

15. In a movable meter construction the combination of a support, a meter mechanism including a casing, a tubular nipple connected with the meter and support for rotatably mounting the meter on the support, said meter mechanism including electrical wires extending through the tubular nipple in a sealed relation therein.

16. In a meter construction the combination of a meter including a casing enclosing the meter operating parts, a vertical extension connected directly with the meter casing, and means mounting the vertical extension for rotation of the meter casing above the axis of said vertical extension for the purpose of facing the meter dial in different angular positions in a horizontal plane.

ORVILLE BUYS.